(12) United States Patent
Zhang et al.

(10) Patent No.: US 12,117,782 B2
(45) Date of Patent: Oct. 15, 2024

(54) LINEAR MOTOR MOTION CONTROL METHOD, DEVICE, EQUIPMENT AND STORAGE MEDIUM

(71) Applicant: GUANGDONG UNIVERSITY OF TECHNOLOGY, Guangzhou (CN)

(72) Inventors: Lanyu Zhang, Guangzhou (CN); Boyu Zhan, Guangzhou (CN); Jian Gao, Guangzhou (CN); Yachao Liu, Guangzhou (CN); Yun Chen, Guangzhou (CN); Xin Chen, Guangzhou (CN); Nan Huang, Guangzhou (CN); Huake Wang, Guangzhou (CN); Xuanzhu Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/430,513

(22) Filed: Feb. 1, 2024

(65) Prior Publication Data

US 2024/0176315 A1    May 30, 2024

Related U.S. Application Data

(63) Continuation of application No. PCT/CN2023/093956, filed on May 12, 2023.

(30) Foreign Application Priority Data

Aug. 22, 2022    (CN) .................... 202211009753.X (51) Int. Cl.
*G05B 13/04*    (2006.01)
*H02P 25/06*    (2016.01)

(52) U.S. Cl.
CPC ......... *G05B 13/042* (2013.01); *G05B 13/048* (2013.01); *H02P 25/06* (2013.01)

(58) Field of Classification Search
CPC ...... G05B 13/042; G05B 13/048; H02P 25/06
See application file for complete search history.

(56) References Cited

U.S. PATENT DOCUMENTS

| | | | |
|---|---|---|---|
| 2009/0005886 A1* | 1/2009 | Gao ....................... | G05B 13/02 700/29 |
| 2020/0089229 A1* | 3/2020 | Lee ..................... | B60W 60/001 |

FOREIGN PATENT DOCUMENTS

| | | |
|---|---|---|
| CN | 1938934 A | 3/2007 |
| CN | 109695893 A | 4/2019 |

(Continued)

OTHER PUBLICATIONS

Lui et al, "Model Predictive Control with Integral Control and Constraint Handling for Mechatronic Systems", 2010, pp. 424-429, downloaded from https://ieeexplore.ieee.org/document/5553527 (Year: 2010).*

(Continued)

*Primary Examiner* — Darrin D Dunn
*Assistant Examiner* — Olvin Lopez Alvarez (57) ABSTRACT

A linear motor motion control method, device, equipment and storage medium. The proposed invention uses an extended state observer constructed in advance based on the model parameters of the linear motor, and performs state estimation based on the total control amount of the linear motor and the actual displacement signal to obtain each observation signal. The phase advance controller is used to improve the estimated lag of the disturbance observation signal, and a model prediction controller built in advance based on the mathematical model of the linear motor is used to perform rolling optimization based on each observation signal to obtain the optimal control amount increment; The (Continued)

total control amount is updated based on the improved disturbance observation signal and the optimal control amount increment, and the corresponding drive signal is output to the drive end of the linear motor based on the updated total control amount.

8 Claims, 4 Drawing Sheets

(56) References Cited

FOREIGN PATENT DOCUMENTS

| CN | 110034715 | * | 7/2019 | ............. H02P 23/14 |
|---|---|---|---|---|
| CN | 110034715 A | | 7/2019 | |
| CN | 110209122 A | * | 9/2019 | ......... G05B 19/4142 |
| CN | 110912480 A | | 3/2020 | |
| CN | 111817638 A | | 10/2020 | |
| CN | 112558469 A | | 3/2021 | |
| CN | 113091088 A | * | 7/2021 | ............... F23N 5/00 |
| CN | 113777930 A | * | 12/2021 | ........... G05B 13/042 |

OTHER PUBLICATIONS

Chenguang et al, "A state-compensation extended state observer for model predictive control", 2017, pp. 1-9, dowloaded from https://www.sciencedirect.com/science/article/pii/S0947358016302503 (Year: 2017).*

Wang et al, "Extended State Observer-Based Predictive Speed Control for Permanent Magnet Linear Synchronous" 2019, pp. 1-11, downloaded from Motorhttps://www.mdpi.com/2227-9717/7/9/618 (Year: 2019).*

Roset et al, "Observer Based Model Predictive Control" 2006 pp. 6, downloaded from chrome-extension://efaidnbmnn-nibpcajpcglclefindmkaj/https://alexandria.tue.nl/openaccess/Metis204663.pdf (Year: 2006).*

Liuping Wang, "Model Predictive Control System Design and Implementation Using MATLAB®", 2009, publisher Springer, pp. 111 (Year: 2009).*

Yachao Liu et al., "Extended State Observer-Based IMC-PID Tracking Control of PMLSM Servo Systems", IEEE Access, Apr. 5, 2021.

Yachao Liu, "Improved Linear Active Disterdancc Rejection Control for Permanent Magnet Linear Synchronous Motor", McCromotors, May 31, 2021.

* cited by examiner

LINEAR MOTOR MOTION CONTROL METHOD, DEVICE, EQUIPMENT AND STORAGE MEDIUM

CROSS-REFERENCE TO RELATED APPLICATIONS

This application is a continuation of International Patent Application No. PCT/CN2023/093956 with a filing date of May 12, 2023, designating the United States, now pending, and further claims priority to Chinese Patent Application No. 202211009753. X with a filing date of Aug. 22, 2022. The content of the aforementioned applications, including any intervening amendments thereto, are incorporated herein by reference.

TECHNICAL FIELD

The invention relates to the technical field of linear motor motion control, and particularly relates to a linear motor motion control method, device, equipment and storage medium.

BACKGROUND OF THE PROPOSED INVENTION

Linear motors have excellent servo performance such as high precision, strong stability and fast response speed. They effectively solve the contradiction between precision, speed and large stroke, and have gradually become the mainstream driving method for high-speed and high-acceleration precision motion platforms. However, since linear motors do not have intermediate mechanical transmission links, they are easily affected by parameter perturbations, thrust fluctuations and other disturbances during high-precision positioning. As one of the key technologies of linear motor precision motion systems, motion control strategy is also the core technology of controllers. How to improve positioning accuracy and anti-interference ability under high response speed has always been a difficult point in research.

PID control (proportional-integral-derivative control) has always been a traditional control method widely used in practical engineering for linear motors due to its simple control structure and convenient parameter adjustment. However, PID control has contradictions among rapidity, overshoot, robustness and high precision, which seriously limits the response speed and anti-interference ability of linear motors under high positioning accuracy indicators. Therefore, it is increasingly difficult for traditional PID control to meet the requirements for high-precision positioning and fast anti-interference of linear motors under high-speed and high-acceleration conditions.

Based on the PID control method, the existing technology uses the expanded state observer to estimate the disturbance, thereby compensating it in the control law. Among them, the existing technology provides a model-free predictive control method for permanent magnet synchronous motors based on an expanded state observer (patent application number is CN201911092531.7). The method includes the following steps: Step A: Use the linear expansion observer to estimate the unknown and disturbed parts of the system, without involving the motor parameters; Step B: The motor reference current vector and feedback current vector are passed through the permanent magnet synchronous motor model-free controller based on the extended state observer, and the reference voltage vector is obtained using a complex vector current regulator. After PWM modulation, the six-way switching signals of the inverter are obtained. This realizes the control of the motor. However, the extended state observer in this method does not make full use of the known model information of the linear motor. Instead, it treats the model parameter information of the linear motor as unknown and unifies it with the unknown external disturbances into a total disturbance for observation and estimation. This is compensated in the control law. When a large disturbance occurs, this method cannot quickly distinguish and suppress the disturbance due to the limitations of the extended state observer, thus significantly reducing the output speed of the control amount, which in turn affects the response speed and anti-interference ability of the linear motor motion system.

The existing technology also provides an expanded state observer-model predictive control method for a rigid-flexible coupled motion platform (patent application number is CN202011297739.5). The method includes: Establish a dynamic model of the rigid-flexible coupled motion platform; and based on this, a prediction model suitable for the rigid-flexible coupled motion platform is proposed; Use the prediction model, a rolling optimization suitable for the high-precision control process of the rigid-flexible coupled motion platform is designed, in which the accumulation error between the prediction output and the motion planning input is defined as the optimization objective function; the expansion observer is applied to the feedback technology of the prediction model to form a closed-loop control algorithm. This method also does not use the model information of the controlled object, and does not consider the lag of the expanded state observer in disturbance observation and suppression. There is a phase lag when performing the disturbance suppression, which results in the inability to suppress disturbances quickly and accurately.

Therefore, it is necessary to study a new linear motor motion control scheme in order to make full use of the known linear motor model information and effectively improve the motion control accuracy, response speed and anti-interference ability of the linear motor.

Contents of the Proposed Invention

The proposed invention provides a linear motor motion control method, device, equipment and storage medium, which is used to solve the technical problem that the existing linear motor motion control scheme has low motion control accuracy, low response speed, and poor anti-interference ability due to the difficulty in quickly distinguishing and suppressing disturbances.

The first aspect of the proposed invention provides a linear motor motion control method, which includes:
   Step S1: a displacement planning signal an actual displacement signal of a linear motor are obtained; An extended state observer constructed in advance based on model parameters of the linear motor is used to perform state estimation based on a total control amount of the linear motor and the actual displacement signal; and a corresponding displacement observation signal, a speed observation signal and a disturbance observation signal are obtained;
   Step S2: A pre-constructed phase advance controller is used to improve an estimated lag of the disturbance observation signal and obtain an improved disturbance observation signal;
   Step S3: a model prediction controller constructed in advance based on a mathematical model of the linear motor is used to perform the rolling optimization based on the displacement planning signal, the displacement observation signal and the speed observation signal to obtain an optimal control amount increment;

Step S4: the total control amount is updated based on the improved disturbance observation signal and the optimal control amount increment, and a corresponding drive signal is output to a drive end of the linear motor based on an updated total control amount; this achieves a motion control of the linear motor.

According to an implementation manner of the first aspect of the proposed invention, the state estimation based on the total control amount of the linear motor and the actual displacement signal includes:

According to the total control amount of the linear motor and the actual displacement signal, the corresponding displacement observation signal, the speed observation signal and the disturbance observation signal are calculated according to the following observation expressions:

$$\begin{cases} \dot{z}_1 = z_2 - l_1(z_1 - y) \\ \dot{z}_2 = z_3 - a_1 z_2 - a_0 z_1 + b_0 u - l_2(z_1 - y) \\ \dot{z}_3 = -l_3(z_1 - y) \end{cases}$$

In the formula, $\dot{z}_1$ is a first-order derivative of the displacement observation signal, $\dot{z}_2$ is a first-order derivative of the speed observation signal, $\dot{z}_3$ is a first-order derivative of the disturbance observation signal, u is the total control amount of the linear motor, y is the actual displacement signal, $z_1$ is the displacement observation signal, $z_2$ is the speed observation signal, $z_3$ is the disturbance observation signal, $l_1$, $l_2$ and $l_3$ are the observation parameters of the extended state observer, $a_0$, $a_1$ and $b_0$ are the model parameters of the linear motor. Among them, $a_0$ represents displacement gain, & represents the speed gain, and $b_0$ represents the control amount gain.

According to an implementable manner of the first aspect of the proposed invention, the model of the linear motor is:

$$\dot{v} = -a_0 y - a_1 v + w(t) + b_0 u$$

In the formula, $\dot{v}$ is a first-order derivative of the actual speed signal of the linear motor, v is the actual speed signal of the linear motor, and w(t) is the external disturbance signal.

The observation parameters of the extended state observer satisfy:

$$\begin{cases} l_1 = 3w_o - a_1 \\ l_2 = 3w_o^2 - 3w_o a_1 - a_0 + (a_1)^2 \\ l_3 = w_o^3 \end{cases}$$

In the formula, $w_o$ is the observation bandwidth parameter.

According to an implementable manner of the first aspect of the proposed invention, the expression of the phase advance controller is $$\frac{Z_d}{Z_3} = \frac{T_e s + 1}{r T_e s + 1}$$

In the formula, $z_d$ is the improved disturbance observation signal, $z_3$ is the disturbance observation signal, r is the adjustment factor (r=0.5), and $T_e$ is the time constant $$\left(T_e = \frac{1}{r w_o}\right),$$

and s is the Laplace transform factor.

According to an implementable manner of the first aspect of the proposed invention, the prediction model used by the model prediction controller is $$Y_p(k) = P_x \Delta X(k) + I y(k) + P_u \Delta U(k)$$

In the formula, k is a current time value, $Y_p$ (k) is a predicted displacement output value sequence ($Y_p$ (k)=[y(k+1|k) y(k+2|k)L y(k+p|k)]$^T_{p \times 1}$), the superscript T indicates transposition, y(k+i|k) is a displacement output value in the future time k+i predicted at the current time k(i=1, 2, . . . , p), $P_x$ is a system matrix ($P_x$= [$CA\Sigma_{x=1}^2 CA^x L\Sigma_{x=1}^p CA^x$]$^T_{p \times 2}$), I is an unit matrix (I=[1 1 L 1]$^T_{p \times 1}$), $P_u$ is a control matrix $$(P_u = \begin{bmatrix} CB & 0 & 0 & L & 0 \\ \sum_{x=1}^{2} CA^{x-1}B & CB & 0 & L & 0 \\ M & M & M & O & M \\ \sum_{x=1}^{m} CA^{x-1}B & \sum_{x=1}^{m-1} CA^{x-1}B & L & L & CB \\ M & M & M & O & M \\ \sum_{x=1}^{p} CA^{x-1}B & \sum_{x=1}^{p-1} CA^{x-1}B & L & L & \sum_{x=1}^{p-m+1} CA^{x-1}B \end{bmatrix}_{p \times m},$$

$$A = \begin{bmatrix} 1 & t \\ -a_0 t & 1 - a_1 t \end{bmatrix}, B = \begin{bmatrix} 0 \\ b_0 t \end{bmatrix}, C = [1 \ 0]),$$

C=[1 0]), t is a signal sampling interval time, $a_1$ represents a speed gain, $b_0$ represents a control amount gain, $\Delta X(k)$ is an observation signal difference sequence ($\Delta X(k)$=[$z_1(k)-z_1(k-1)$ $z_2(k)-z_2(k-1)$]$^T$), $z_1$ (k) represents the displacement observation signal at current time k, z(k−1) represents the displacement observation signal at a time k−1, $z_2$ (k) is the speed observation signal at the current time k, $z_2$ (k−1) represents the speed observation signal at the time k−1, y(k) is the actual displacement signal at the time k, $\Delta U(k)$ is a control increment sequence ($\Delta U(k)$=[$\Delta u_0(k)$ $\Delta u_0(k+1)$ L $\Delta u_0(k+m-1)$]$^T_{m \times 1}$), $\Delta u_0(j)$ represents the optimal control amount increment, m is a control time domain, and p is a prediction time domain.

According to an implementable manner of the first aspect of the proposed invention, the rolling optimization is performed according to the displacement planning signal, the displacement observation signal and the speed observation signal to obtain the optimal control amount increment, including:

The displacement output value sequence is obtained through the prediction model, and the displacement output value sequence is substituted into the following optimization objective function:

$$J(m, p) = (Y_p(k) - R(k))^T Q(Y_p(k) - R(k)) + \Delta U(k)^T W \Delta U(k)$$

In the formula, m is the control time domain, p is the prediction time domain, R(k) is the displacement planning signal sequence R(k)=[r(k+1) r(k+2) L r(k+p)]$^T_{p \times 1}$), r(k+i) is the displacement planning signal, Q and W are the weight matrix that needs to be designed (Q=diag[$q_1$ $q_2$ L $q_i$]$_{p \times p}$, $q_1$, $q_2$, $q_i$ respectively correspond to the weight of the first, second, and ith signals in the obtained sequence $Y_p(k)-R(k)$, $w=\text{diag}[w_1\ w_2\ L\ w_i]_{m\times m}$, $w_1, w_2, w_i$ respectively correspond to the weights of the first, second, and ith signals in $\Delta U(k)$);

Taking $$\frac{dJ}{d\Delta U(k)} = 0$$

as extreme value condition, the an optimization objective function according to the extreme value condition is solved, and the optimal control amount increment is obtained:

$\Delta u_0(k) = [1\ 0\ L\ 0]_{1\times m}\ (P_u^T Q^T Q P_u + W^T W)^{-1} P_u^T Q^T Q(R(k+1)-P_x\Delta\hat{X}(k)-Iy(k))$ According to an implementable manner of the first aspect of the proposed invention, the updating of the total control amount according to the improved disturbance observation signal and the optimal control amount increment includes:

The optimal control amount according to the optimal control amount increment is obtained;

The total control amount is updated according to the following formula:

$$u = u_0 - \frac{z_d}{b_0}$$

In the formula, u represents the total control amount, $u_0$ represents the optimal control amount, $z_d$ is the improved disturbance observation signal, $b_0$ is a parameter in the model of the linear motor, and represents the control amount gain.

The second aspect of the proposed invention provides a linear motor motion control system, characterized in that it includes:

A signal acquisition module is used to acquire the displacement planning signal and the actual displacement signal of the linear motor;

An extended state observer, which is constructed based on the model parameters of the linear motor, is used to perform state estimation based on the total control amount of the linear motor and the actual displacement signal, and obtain the corresponding displacement observation signal, speed observation signal and disturbance observation signal;

A phase advance controller is used to improve the estimated lag of the disturbance observation signal and obtain an improved disturbance observation signal;

A model prediction controller, which is constructed based on the mathematical model of the linear motor, is used to perform the rolling optimization based on the displacement planning signal, the displacement observation signal and the speed observation signal to, and obtain the optimal control amount increment;

A motor control module, configured to update the total control amount according to the improved disturbance observation signal and the optimal control amount increment, and output a corresponding drive signal to the drive end of the linear motor according to the updated total control amount. This realizes the motion control of the linear motor.

According to an implementable manner of the second aspect of the proposed invention, the extended state observer is specifically used for:

According to the total control amount of the linear motor and the actual displacement signal, the corresponding displacement observation signal, the speed observation signal and the disturbance observation signal are calculated according to the following observation expressions:

$$\begin{cases} \dot{z}_1 = z_2 - l_1(z_1 - y) \\ \dot{z}_2 = Z_3 - a_1 z_2 - a_0 z_1 + b_0 u - l_2(Z_1 - y) \\ \dot{z}_3 = -l_3(z_1 - y) \end{cases}$$

In the formula, $\dot{z}_1$ is a first-order derivative of the displacement observation signal, $\dot{z}_2$ is a first-order derivative of the speed observation signal, $\dot{z}_3$ is a first-order derivative of the disturbance observation signal, u is the total control amount of the linear motor, y is the actual displacement signal, $z_1$ is the displacement observation signal, $z_2$ is the speed observation signal, $z_3$ is the disturbance observation signal, $l_1, l_2$ and $l_3$ are the observation parameters of the extended state observer, $a_0, a_1$ and $b_0$ are the model parameters of the linear motor. Among them, $a_0$ represents displacement gain, $a_1$ represents speed gain, and $b_0$ represents control amount gain.

According to an implementable manner of the second aspect of the proposed invention, the model of the linear motor is:

$\dot{v} = -a_0 y - a_1 v + w(t) + b_0 u$ in the formula, $\dot{v}$ is a first-order derivative of the actual speed signal of the linear motor, v is the actual speed signal of the linear motor, and w(t) is the external disturbance signal;

The observation parameters of the extended state observer satisfy:

$$\begin{cases} l_1 = 3w_o - a_1 \\ l_2 = 3w_o^2 - 3w_o a_1 - a_0 + (a_1)^2 \\ l_3 = w_o^3 \end{cases}$$

In the formula, $w_0$ is an observation bandwidth parameter.

According to an implementable manner of the second aspect of the proposed invention, the expression of the phase advance controller is:

$$\frac{z_d}{z_3} = \frac{T_e s + 1}{rT_e s + 1}$$

In the formula, $z_d$ is the improved disturbance observation signal, $z_3$ is the disturbance observation signal, r is an adjustment factor (r=0.5), and $T_e$ is a time constant $$\left(T_e = \frac{1}{rw_o}\right),$$

and s is a Laplace transform factor.

According to an implementable manner of the second aspect of the proposed invention, the prediction model used by the model prediction controller is:

$Y_p(k) = P_x \Delta X(k) + Iy(k) + P_u \Delta U(k)$

In the formula, k is the current time value, $Y_p(k)$ is the predicted displacement output value sequence ($Y_p(k) = [y(k+1|k)\ y(k+2|k)\ L\ y(k+p|k)]^T_{p\times 1}$), the superscript T indicates transposition, y(k+i|k) is the displacement output value in the future time k+i predicted at the current time k(i= 1, 2, . . . , p), $P_x$ is the system matrix ($P_x =$ $[CA\Sigma_{x=1}^{2}CA^{x}L\Sigma_{x=1}^{P}CA^{x}]_{p\times 2}^{T})$, I is the unit matrix (I=[1 1 L 1]$_{p\times 1}^{T}$), $P_u$ is the control matrix $$\begin{cases} P_u = \begin{bmatrix} CB & 0 & 0 & L & 0 \\ \sum_{x=1}^{2}CA^{x-1}B & CB & 0 & L & 0 \\ M & M & M & O & M \\ \sum_{x=1}^{m}CA^{x-1}B & \sum_{x=1}^{m-1}CA^{x-1}B & L & L & CB \\ M & M & M & O & M \\ \sum_{x=1}^{p}CA^{x-1}B & \sum_{x=1}^{p-1}CA^{x-1}B & L & L & \sum_{x=1}^{p-m+1}CA^{x-1}B \end{bmatrix}_{p\times m}, \\ \\ A = \begin{bmatrix} 1 & t \\ -a_0t & 1-a_1t \end{bmatrix}, B = \begin{bmatrix} 0 \\ b_0t \end{bmatrix}, C = [1 \ 0] \end{cases}$$

t is the signal sampling interval time, $a_1$ represents the speed gain, $b_0$ represents the control amount gain, $\Delta X(k)$ is the observation signal difference sequence ($\Delta X(k)=[z_1(k)-z_1(k-1) \ z_2(k)-z_2(k-1)]^T$), $z_1(k)$ represents the displacement observation signal at time k, $z_1(k-1)$ represents the displacement observation signal at time k−1, $z_2(k)$ is the speed observation signal at time k, $z_2(k-1)$ represents the speed observation signal at the time k−1, y(k) is the actual displacement signal at the time k, $\Delta U(k)$ is the control increment sequence ($\Delta U(k)=[\Delta u_0(k) \ \Delta u_0(k+1) \ L \ \Delta u_0(k+m-1)]^T_{m\times m1}$), $\Delta u_0(j)$ represents the optimal control amount increment, m is the control time domain, and p is the prediction time domain.

According to an implementable manner of the second aspect of the proposed invention, the model prediction controller is specifically used for:

The displacement output value sequence is obtained through the prediction model, and the displacement output value sequence is substituted into the following optimization objective function:

$$J(m, p)=(Y_p(k)-R(k))^TQ(Y_p(k)-R(k))+\Delta U(k)^TW\Delta U(k)$$

In the formula, m is the control time domain, p is the prediction time domain, R(k) is the displacement planning signal sequence (R(k)=[r(k+1) r(k+2) L r(k+p)]$^T_{p\times 1}$), r(k+i) is the displacement planning signal, Q and W are the weight matrix that needs to be designed (Q=diag[$q_1 \ q_2 \ L \ q_i]_{p\times p}$, $q_1$, $q_2$, $q_i$ respectively correspond to the weight of the first, second, and ith signals in the obtained sequence $Y_p(k)-R(k)$, W=diag[$w_1 \ w_2 \ L \ w_i]_{m\times m}$, $w_1$, $w_2$, $w_i$ respectively correspond to the weights of the first, second, and ith signals in $\Delta U(k)$);

Taking $$\frac{dJ}{d\Delta U(k)} = 0$$

as the extreme value condition, solve the optimization objective function according to the extreme value condition, and obtain the optimal control amount increment:

$$\Delta u_0(k)=[1 \ 0 \ L \ 0]_{1\times m}(P_u^TQ^TQP_u+W^TW)^{-1}P_u^TQ_TQ(R(k+1)-P_x\Delta \hat{X}(k)-Iy(k))$$

According to an implementable manner of the second aspect of the proposed invention, the motor control module includes:

An optimal control amount determination unit is used to obtain the optimal control amount based on the optimal control amount increment;

The update calculation unit is used to update the total control amount according to the following formula:

$$u = u_0 - \frac{z_d}{b_0}$$

In the formula, u represents the total control amount, $u_0$ represents the optimal control amount, $z_d$ is the improved disturbance observation signal, $b_0$ is a parameter in the model of the linear motor, and represents the control amount gain.

The third aspect of the proposed invention provides a linear motor motion control device, which includes:

A memory is used to store instructions; wherein the instructions are used to implement the linear motor motion control method as described in any of the above ways;

A processor is used for executing instructions in the memory.

The fourth aspect of the proposed invention is a computer-readable storage medium. A computer program is stored on the computer-readable storage medium. When the computer program is executed by a processor, the linear motor movement control method can be realized in any of the above-mentioned ways.

It can be seen from the above technical solutions that the proposed invention has the following advantages:

The proposed invention obtains the displacement planning signal and the actual displacement signal of the linear motor; an extended state observer constructed in advance based on the model parameters of the linear motor is used to perform state estimation based on the total control amount of the linear motor and the actual displacement signal, and obtain the corresponding displacement observation signal, the speed observation signal and the disturbance observation signal; a pre-constructed phase advance controller is used to improve the estimated lag of the disturbance observation signal and obtain an improved disturbance observation signal; a model prediction controller constructed in advance based on the mathematical model of the linear motor is used to perform the rolling optimization according to the displacement planning signal, the displacement observation signal and the speed observation signal to obtain the optimal control amount increment; the total control amount is updated according to the improved disturbance observation signal and the optimal control amount increment, and a corresponding drive signal is output to the drive end of the linear motor according to the updated total control amount to achieve motion control of the linear motor;

The proposed invention makes full use of the model parameter information of the linear motor, performs signal observation based on the extended state observer constructed using the model parameter information, and performs signal prediction based on the model prediction controller constructed using the mathematical model of the linear motor. The disturbance signal of the system can be accurately observed, and then the targeted control and compensation can be carried out. The proposed invention also improves the estimation lag of the disturbance observation signal through the phase advance controller, thereby improving the estimation speed of disturbances and states by the extended state observer and ensuring that the system can process disturbances quickly. This solves the technical problem that the existing linear motor motion control scheme is difficult to quickly distinguish and suppress disturbances, making the linear motor motion control accuracy and response speed low, and its anti-interference ability poor.

DESCRIPTION OF THE DRAWINGS

In order to explain the embodiments of the proposed invention or the technical solutions in the prior art more clearly. The drawings that need to be used in the description of the embodiments or prior art will be briefly introduced below. Obviously, the drawings in the following description are only some embodiments of the proposed invention. For those of ordinary skill in the art, other drawings can be obtained based on these drawings without exerting any creative effort.

REFERENCE SIGNS

Figure 5:
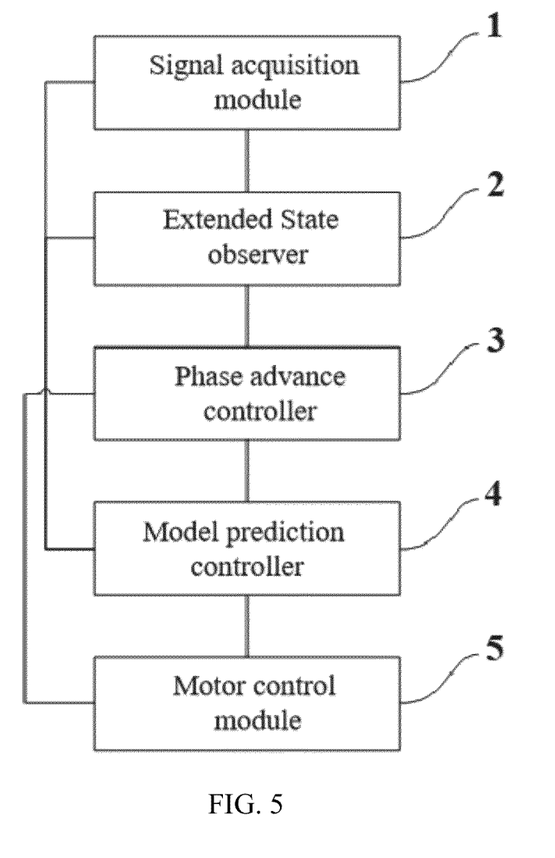
FIG. 5 is a structural connection block diagram of the linear motor motion control device provided by an optional embodiment of the proposed invention.

In FIG. 5, 1—signal acquisition module; 2—extended state observer; 3—phase advance controller; 4—model prediction controller; 5—motor control module.

DETAILED DESCRIPTION OF PREFERRED EMBODIMENTS

The embodiments of the proposed invention provide a linear motor motion control method, device, equipment and storage medium, which is used to solve the technical problem that the existing linear motor motion control scheme has low motion control accuracy, low response speed, and poor anti-interference ability due to the difficulty in quickly distinguishing and suppressing disturbances.

In order to make the purpose, features, and advantages of the proposed invention more obvious and easier to understand, the technical solutions in the embodiments of the proposed invention will be clearly and completely described below in conjunction with the accompanying drawings in the embodiments of the proposed invention. Obviously, the embodiments described below are only some, not all, of the embodiments of the proposed invention. Based on the embodiments of the proposed invention, all other embodiments obtained by those of ordinary skill in the art without creative efforts fall within the scope of protection of the proposed invention.

The invention provides a linear motor motion control method.

Figure 1:
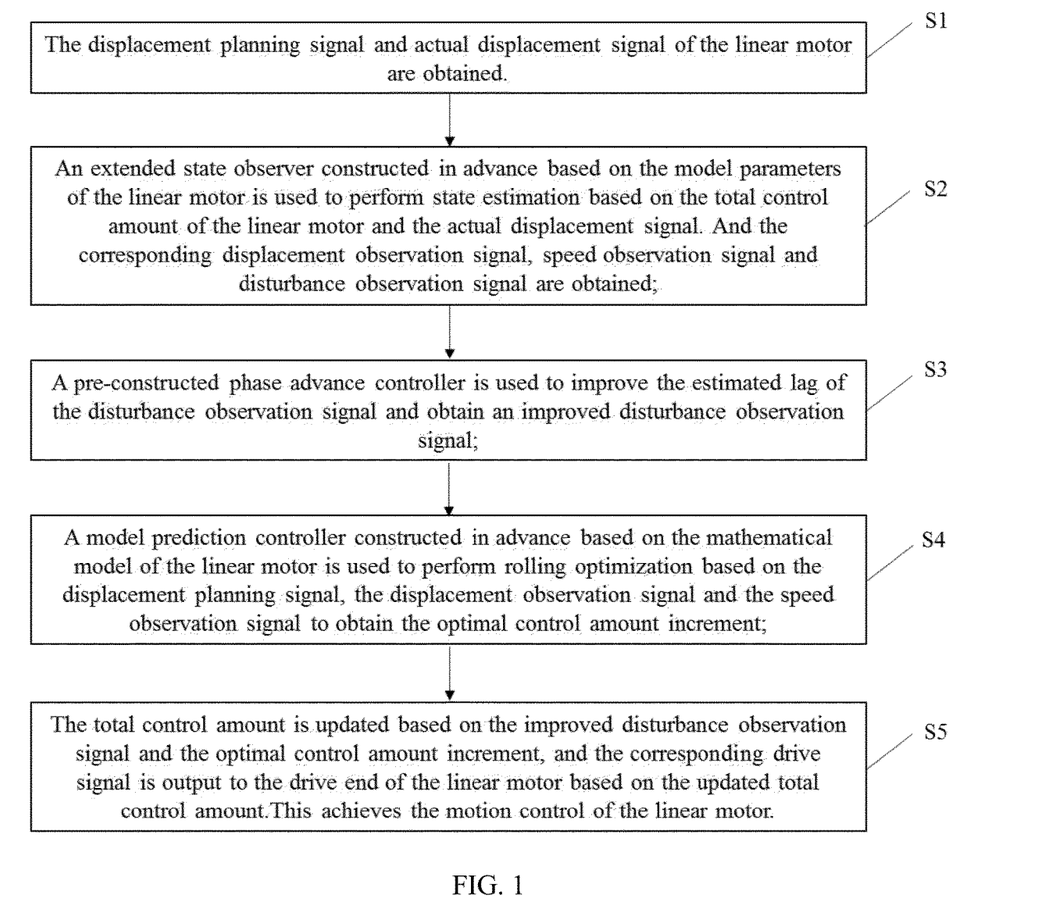
FIG. 1 is a flow chart of the linear motor motion control method provided by an optional embodiment of the proposed invention.
Figure 2:
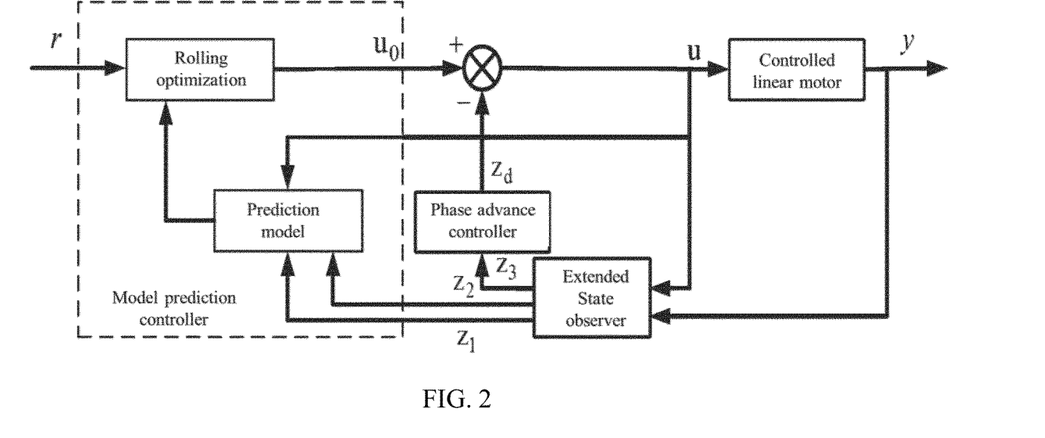
FIG. 2 is a schematic diagram of the control principle of the linear motor motion control method provided by an optional embodiment of the proposed invention.

FIG. 1 shows a flow chart of the linear motor motion control method provided by an optional embodiment of the proposed invention;

FIG. 2 shows a schematic diagram of the control principle of the linear motor motion control method provided by an optional embodiment of the proposed invention;

As shown in FIGS. 1 and 2, the linear motor motion control method provided by an embodiment of the proposed invention includes steps S1-S5.

Step S1: The displacement planning signal and the actual displacement signal of the linear motor are obtained.

Step S2: An extended state observer constructed in advance based on the model parameters of the linear motor is used to perform state estimation based on the total control amount of the linear motor and the actual displacement signal. And the corresponding displacement observation signal, the speed observation signal and the disturbance observation signal are obtained;

In this embodiment, the extended state observer is designed according to the model parameters of the linear motor. Among them, the model parameters of the linear motor can be obtained through system identification, searching the product manual of the linear motor, etc. After obtaining the model parameters of the linear motor, the model parameters of the linear motor can be used to design the extended state observer. Then the linear motor part no longer needs to be estimated. Therefore, the disturbance observation signal obtained by the extended state observer in this embodiment is only the estimation result of the external disturbance signal, and does not include the estimation result of the model structure of the linear motor in the prior art. Therefore, it can effectively improve the estimation accuracy of the external unknown disturbances.

In an implementable manner, the state estimation based on the total control amount of the linear motor and the actual displacement signal includes:

According to the total control amount of the linear motor and the actual displacement signal, the corresponding displacement observation signal, the speed observation signal and the disturbance observation signal are calculated according to the following observation expressions:

$$\begin{cases} \dot{z}_1 = z_2 - l_1(z_1 - y) \\ \dot{z}_2 = z_3 - a_1 z_2 - a_0 z_1 + b_0 u - l_2(z_1 - y) \\ \dot{z}_3 = -l_3(z_1 - y) \end{cases}$$

In the formula, $\dot{z}_1$ is a first-order derivative of the DISPLACEMENT OBSERVATION SIGNAL, $\dot{z}_2$ IS A FIRST-ORDER DERIVATIVE OF THE speed observation signal, $\dot{z}_3$ is a first-order derivative of the disturbance observation signal, u is the total control amount of the linear motor, y is the actual displacement signal, u is the total control amount of the linear motor, $z_1$ is the displacement observation signal, $z_2$ is the speed observation signal, $z_3$ is the disturbance observation signal, $l_1$, $l_2$ and $l_3$ bare the observation parameters of the extended state observer, $a_0$, $a_1$ and $b_0$ are the model parameters of the linear motor. Among them, $a_0$ represents displacement gain, $a_1$ represents the speed gain, and $b_0$ represents the control amount gain.

In an implementable manner, the model of the linear motor is $$\dot{v} = -a_0 y - a_1 v + w(t) + b_0 u$$

In the formula, $\dot{v}$ is a first-order derivative of the actual speed signal of the linear motor, v is the actual speed signal of the linear motor, and w(t) is the external disturbance signal;

The observation parameters of the extended state observer satisfy:

$$\begin{cases} l_1 = 3w_o - a_1 \\ l_2 = 3w_o^2 - 3w_o a_1 - a_0 + (a_1)^2 \\ l_3 = w_o^3 \end{cases}$$

In the formula, $w_0$ is the observation bandwidth parameter.

In this embodiment, the bandwidth adjustment method is used to design the size of the observation parameters, which is simple and convenient. Among them, the model parameters of the linear motor can be obtained through system identification based on the model of the linear motor. Specifically, for a certain linear motor, the model parameters can be identified by obtaining its actual displacement, speed and acceleration under the known total control amount and known external disturbance signal.

Step S3: A pre-constructed phase advance controller is used to improve the estimated lag of the disturbance observation signal and obtain an improved disturbance observation signal;

In an implementable manner, the expression of the phase advance controller is:

$$\frac{z_d}{z_3} = \frac{T_e s + 1}{r T_e s + 1}$$

In the formula, $z_d$ is the improved disturbance observation signal, $z_3$ is the disturbance observation signal, r is the adjustment factor (r=0.5), and $T_e$ is the time constant $$\left( T_e = \frac{1}{r w_o} \right),$$

and s is the Laplace transform factor.

In order to improve the estimation accuracy of the external disturbance signal by the disturbance observation signal, in this embodiment, the pre-designed phase advance controller is called to compensate and improve the estimation lag, and the improved disturbance observation signal obtained is better than the original disturbance observation signal. The improved signal has higher accuracy and can effectively improve the suppression effect of the disturbance suffered by the linear motor.

Step 4: A model prediction controller constructed in advance based on the mathematical model of the linear motor is used to perform the rolling optimization based on the displacement planning signal, the displacement observation signal and the speed observation signal to obtain the optimal control amount increment;

In an implementable manner, the prediction model used by the model prediction controller is:

$$Y_p(k) = P_x \Delta X(k) + I y(k) + P_u \Delta U(k)$$

In the formula, k is the current time value, $Y_p(k)$ is the predicted displacement output value sequence ($Y_p(k)=[y(k+1|k)\ y(k+2|k)\ L\ y(k+p|k)]^T_{p \times 1}$), the superscript T indicates transposition, y(k+i|k) is the displacement output value in the future time k+i predicted at the current time k(i=1, 2, . . . , p), $P_x$ is the system matrix ($P_x = CA\Sigma_{x=1}^{2} CA^x L \Sigma_{x=1}^{p} CA^x]^T_{p \times 2}$), I is the unit matrix (I=[1 1 L 1]$^T_{p \times 1}$), $P_u$ is the control matrix $$\left\{ P_u = \begin{bmatrix} CB & 0 & 0 & L & 0 \\ \sum_{x=1}^{2} CA^{x-1}B & CB & 0 & L & 0 \\ M & M & M & O & M \\ \sum_{x=1}^{m} CA^{x-1}B & \sum_{x=1}^{m-1} CA^{x-1}B & L & L & CB \\ M & M & M & O & M \\ \sum_{x=1}^{p} CA^{x-1}B & \sum_{x=1}^{p-1} CA^{x-1}B & L & L & \sum_{x=1}^{p-m+1} CA^{x-1}B \end{bmatrix}_{p \times m}, \right.$$

$$\left. A = \begin{bmatrix} 1 & t \\ -a_0 t & 1 - a_1 t \end{bmatrix}, B = \begin{bmatrix} 0 \\ b_0 t \end{bmatrix}, C = [1\ 0] \right\}$$

t is the signal sampling interval time, $a_1$ represents the speed gain, $b_0$ represents the control amount gain, $\Delta X(k)$ is the difference observation signal sequence ($\Delta X(k)=[z_1(k)-z_1(k-1)\ z_2(k)-z_2(k-1)]^T$), $z_1(k)$ represents the displacement observation signal at time k, $z_1(k-1)$ represents the displacement observation signal at time k−1, $z_2(k)$ is the speed observation signal at time k, $z_2(k-1)$ represents the speed observation signal at the time k−1, y(k) is the actual displacement signal at the time k, $\Delta U(k)$ is the control increment sequence ($\Delta U(k)=[\Delta u_0(k)\ \Delta u_0(k+1)\ L\ \Delta u_0(k+m-1)]^T_{m \times 1}$), $\Delta u_0(j)$ represents the optimal control amount increment, m is the control time domain, and p is the prediction time domain.

In an implementable manner, the rolling optimization is performed according to the displacement planning signal, the displacement observation signal and the speed observation signal to obtain the optimal control amount increment, which includes:

The displacement output value sequence is obtained through the prediction model, and the displacement output value sequence is substituted into the following optimization objective function:

$$J(m, p) = (Y_p(k) - R(k))^T Q(Y_p(k) - R(k)) + \Delta U(k)^T W \Delta U(k)$$

In the formula, m is the control time domain, p is the prediction time domain, R(k) is the displacement planning signal sequence $(R(k)=[r(k+1)\ r(k+2)\ L\ r(k+p)]^T_{p\times 1})$, $r(k+i)$ is the displacement planning signal, Q and W are the weight matrix that needs to be designed ($Q=\text{diag}[q_1\ q_2\ L\ q_i]_{p\times p}$, $q_1$, $q_2$, $q_i$ respectively correspond to the weight of the first, second, and ith signals in the obtained sequence $Y_p(k)-R(k)$, $W=\text{diag}[w_1\ w_2\ L\ w_i]_{m\times m}$, $w_1$, $w_2$, $w_i$ respectively correspond to the weights of the first, second, and ith signals in $\Delta U(k)$);

Taking $$\frac{dJ}{d\Delta U(k)} = 0$$

as the extreme value condition, solve the optimization objective function according to the extreme value condition, and obtain the optimal control amount increment:

$$\Delta u_0(k)=[1\ 0\ L\ 0]_{1\times m}(P_u^T Q^T Q P_u + W^T W)^{-1} P_u^T Q^T Q(R(k+1)-P_x\Delta \hat{X}(k)-Iy(k))$$

Step S5: The total control amount is updated based on the improved disturbance observation signal and the optimal control amount increment, and the corresponding drive signal is output to the drive end of the linear motor based on the updated total control amount. This achieves the motion control of the linear motor.

In an implementable manner, the updating of the total control amount according to the improved disturbance observation signal and the optimal control amount increment includes:

The optimal control amount according to the optimal control amount increment is obtained;
The total control amount is updated according to the following formula:

$$u = u_0 - \frac{z_d}{b_0}$$

In the formula, u represents the total control amount, $u_0$ represents the optimal control amount, $z_d$ is the improved disturbance observation signal, $b_0$ is a parameter in the model of the linear motor, and represents the control amount gain.

In this embodiment, the optimal control amount increment is generated based on the model prediction controller designed based on the mathematical model of the linear motor. Combining the optimal control amount increment and the disturbance observation signal improved by the phase advance controller, the total control amount is updated and calculated to adjust the drive signal corresponding to the total control amount for driving the linear motor in real time. It is conceivable that the total control amount calculated based on the improved disturbance observation signal with higher accuracy is bound to have higher accuracy, which can effectively improve the motion control accuracy and control speed of the linear motor.

Generally, the linear motor can be driven by a voltage signal, and the output force of the linear motor depends on the current generated by the voltage signal. Therefore, specifically, the drive signal may be a voltage signal. Of course, a current drive method can also be used, that is, the drive signal can also be a current signal.

The above embodiments of the proposed invention make full use of the model parameter information of the linear motor. Based on the extended state observer pre-designed according to the model parameters of the linear motor and the model prediction controller pre-designed based on the mathematical model of the linear motor, the disturbance signal of the system is accurately observed, and the targeted control and compensation is carried out. This can greatly improve the motion control accuracy and response speed of the linear motor, and effectively optimize the anti-interference performance of the linear motor control.

The beneficial effects of the linear motor motion control method provided in this application will be described in detail below with reference to specific schematic diagrams.

Figure 3:
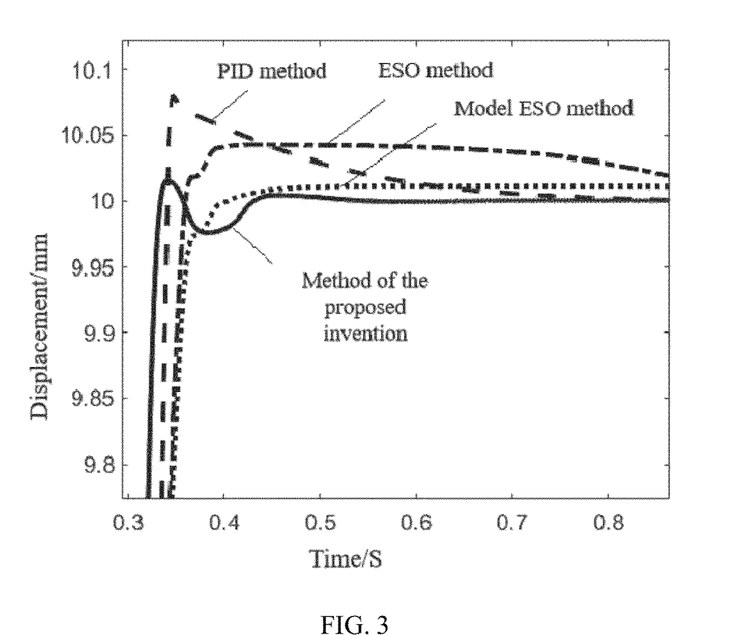
FIG. 3 is a schematic diagram of the linear motor displacement response curve corresponding to the linear motor motion control method of the proposed application and the existing method when there is no external disturbance signal, provided by an optional embodiment of the proposed invention.
Figure 4:
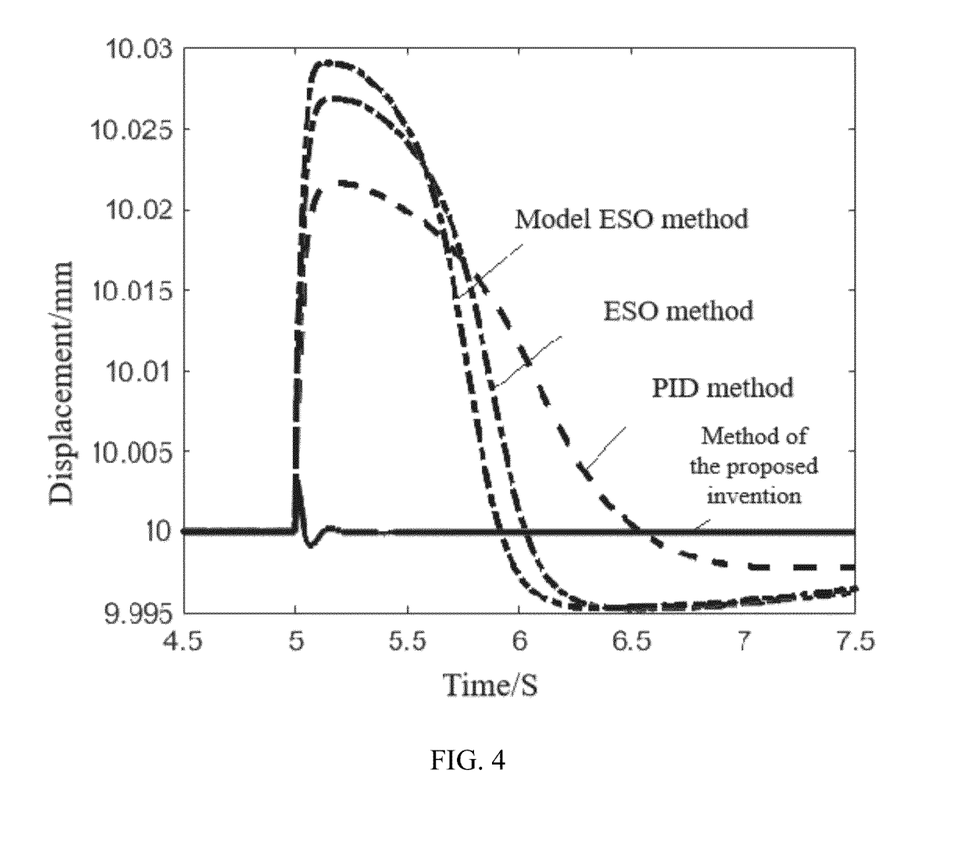
FIG. 4 is a schematic diagram of the linear motor displacement response curve corresponding to the linear motor motion control method of the proposed application and the existing method when an external disturbance signal acts, provided by an optional embodiment of the proposed invention.

As can be seen from FIG. 3-4, compared with the PID method and the conventional ESO (Expanded State Observer) control method in the prior art, the method provided by this application has smaller overshoot and shorter stabilization time, which can effectively improve the displacement control accuracy of the linear motor; at the same time, compared with the control method containing model ESO in the prior art, the method provided by this application has a short adjustment time and a fast response.

Specifically, as shown in FIG. 4, an external disturbance signal of certain amplitude is added in the 5th second period. Based on the linear motor motion control method provided by the embodiment of the proposed application, the motion displacement of the linear motor is effectively regulated, and the displacement is quickly adjusted to the target planning value when the external disturbance signal acts. Compared with the conventional ESO and model-based ESO control methods, the linear motor motion control method provided by the embodiments of the proposed application can effectively improve the accuracy of observation and estimation of external disturbance signals, thereby improving the anti-interference performance of the system.

The invention also provides a linear motor motion control system.

Please refer to FIG. 5, which shows a structural connection block diagram of the linear motor motion control system provided by an embodiment of the proposed invention.

The linear motor motion control system provided by an embodiment of the proposed invention includes:

A signal acquisition module 1 is used to acquire the displacement planning signal and the actual displacement signal of the linear motor;

An extended state observer 2, which is constructed based on the model parameters of the linear motor, is used to perform state estimation based on the total control amount of the linear motor and the actual displacement signal, and obtain the corresponding displacement observation signal, the speed observation signal and the disturbance observation signal;

A phase advance controller 3 is used to improve the estimated lag of the disturbance observation signal and obtain an improved disturbance observation signal;

A model prediction controller 4, which is constructed based on the mathematical model of the linear motor, is used to perform the rolling optimization based on the displacement planning signal, the displacement observation signal and the speed observation signal to obtain the optimal control amount increment;

A motor control module 5, configured to update the total control amount according to the improved disturbance observation signal and the optimal control amount increment, and output a corresponding drive signal to the drive end of the linear motor according to the updated total control amount. This realizes the motion control of the linear motor.

In a way that can be implemented, the extended state observer 2 is specifically used to:

According to the total control amount of the linear motor and the actual displacement signal, the corresponding displacement observation signal, the speed observation signal and the disturbance observation signal are calculated according to the following observation expressions:

$$\begin{cases} \dot{z}_1 = z_2 - l_1(z_1 - y) \\ \dot{z}_2 = Z_3 - a_1 z_2 - a_0 z_1 + b_0 u - l_2(Z_1 - y) \\ \dot{z}_3 = -l_3(z_1 - y) \end{cases}$$

In the formula, $\dot{z}_1$ is a first-order derivative of the displacement observation signal, $\dot{z}_2$ is a first-order derivative of the speed observation signal, $\dot{z}_3$ is a first-order derivative of the disturbance observation signal, u is the total control amount of the linear motor, y is the actual displacement signal, u is the total control amount of the linear motor, $z_1$ is the displacement observation signal, $z_2$ is the speed observation signal, $z_3$ is the disturbance observation signal, $l_1$, $l_2$ and $l_3$ are the observation parameters of the extended state observer, $a_0$, $a_1$ and $b_0$ are the model parameters of the linear motor. Among them, $a_0$ represents displacement gain, $a_1$ represents the speed gain, and $b_0$ represents the control amount gain.

In a way that can be implemented, the model of the linear motor is:

$$\dot{v} = -a_0 y - a_1 v + w(t) + b_0 u$$

In the formula, $\dot{v}$ is a first-order derivative of the actual speed signal of the linear motor, v is the actual speed signal of the linear motor, and w(t) is the external disturbance signal;

The observation parameters of the extended state observer 2 satisfy:

$$\begin{cases} l_1 = 3w_o - a_1 \\ l_2 = 3w_o^2 - 3w_o a_1 - a_0 + (a_1)^2 \\ l_3 = w_o^3 \end{cases}$$

In the formula, $w_o$ is the observation bandwidth parameter.

In a way that can be implemented, the expression of the phase advance controller model is:

$$\frac{z_d}{z_3} = \frac{T_e s + 1}{rT_e s + 1}$$

In the formula, $z_d$ is the improved disturbance observation signal, $z_3$ is the disturbance: observation signal, r is the adjustment factor (r=0.5), and $T_e$ is the time constant $$\left(T_e = \frac{1}{rw_o}\right),$$

and s is the Laplace transform factor.

In a way that can be implemented, the prediction model used by the model prediction controller 4 is $$Y_p(k) = P_x \Delta X(k) + Iy(k) + P_u \Delta U(k)$$

In the formula, k is the current time value, $Y_p(k)$ is the predicted displacement output value sequence ($Y_p(k) = [y(k+1|k) \; y(k+2|k) \; L \; y(k+p|k)]^T_{p \times 1}$), the superscript T indicates transposition, y(k+i|k) is the displacement output value in the future time k+i predicted at the current time k(i=1, 2, . . . , p), $P_x$ is the system matrix ($P_x = [CA\Sigma_{x=1}^2 CA^x L \Sigma_{x=1}^p CA^x]^T_{p \times 2}$), $P_x$ unit matrix ($I = [1 \; 1 \; L \; 1]^T_{p \times 1}$), $P_u$ is the control matrix $$\left\{ P_u = \begin{bmatrix} CB & 0 & 0 & L & 0 \\ \sum_{x=1}^{2} CA^{x-1}B & CB & 0 & L & 0 \\ M & M & M & O & M \\ \sum_{x=1}^{m} CA^{x-1}B & \sum_{x=1}^{m-1} CA^{x-1}B & L & L & CB \\ M & M & M & O & M \\ \sum_{x=1}^{p} CA^{x-1}B & \sum_{x=1}^{p-1} CA^{x-1}B & L & L & \sum_{x=1}^{p-m+1} CA^{x-1}B \end{bmatrix}_{p \times m}, \right.$$

$$\left. A = \begin{bmatrix} 1 & t \\ -a_0 t & 1 - a_1 t \end{bmatrix}, B = \begin{bmatrix} 0 \\ b_0 t \end{bmatrix}, C = [1 \; 0] \right\}$$

t is the signal sampling interval time, $a_1$ represents the speed gain, b represents the control amount gain, $\Delta X(k)$ is the observation signal difference sequence ($\Delta X(k) = [z_1(k) - z_1(k-1) \; z_2(k) - z_2(k-1)]^T$), $z_1(k)$ represents the displacement observation signal at time k, $z_1(k-1)$ represents the displacement observation signal at time k−1, $z_2(k)$ is the speed observation signal at time k, $z_2(k-1)$ represents the speed observation signal at the time k−1, y(k) is the actual displacement signal at the time k, $\Delta U(k)$ is the control increment sequence ($\Delta U(k) = [\Delta u_0(k) \; \Delta u_0(k+1) \; L \; \Delta u_0(k+m-1)]^T_{m \times 1}$), $\Delta u_0(j)$ represents the optimal control amount increment, m is the control time domain, and p is the prediction time domain.

In a way that can be implemented, the model prediction controller 4 is specifically used for:

The displacement output value sequence is obtained through the prediction model, and the displacement output value sequence is substituted into the following optimization objective function:

$$J(m, p) = (Y_p(k) - R(k))^T Q(Y_p(k) - R(k)) + \Delta U(k)^T W \Delta U(k)$$

In the formula, m is the control time domain, p is the prediction time domain, R(k) is the displacement planning signal sequence ($R(k) = [r(k+1) \; r(k+2) \; L \; r(k+p)]^T_{p \times 1}$), r(k+i) is the displacement planning signal, Q and W are the weight matrix that needs to be designed ($Q = \text{diag}[q_1 \; q_2 \; L \; q_i]_{p \times p}$, $q_1$, $q_2$, $q_i$ respectively correspond to the weight of the first, second, and ith signals in the obtained sequence $Y_p(k) - R(k)$, $W = \text{diag}[w_1 w_2 \; L \; w_i]_{m \times m}$, $w_1$, $w_2$, $w_i$ respectively correspond to the weights of the first, second, and ith signals in $\Delta U(k)$);

Taking $$\frac{dJ}{d\Delta U(k)} = 0$$

as the extreme value condition, solve the
optimization objective function according to the extreme value condition, and obtain the optimal control amount increment:

$$\Delta u_0(k)=[1\ 0\ L\ 0]_{1\times m}(P_u^T Q^T Q P_u + W^T W)^{-1} P_u^T Q^T Q(R(k+1)-P_x \Delta \hat{X}(k)-Iy(k))$$

In a way that can be implemented, the motor control module 5 includes:

The optimal control amount determination unit is used to obtain the optimal control amount based on the optimal control amount increment;

The calculation unit is updated, which is used to update the total control amount according to the following formula:

$$u = u_0 - \frac{z_d}{b_0}$$

In the formula, u represents the total control amount, $u_0$ represents the optimal control amount, $z_d$ is the improved disturbance observation signal, $b_0$ is a parameter in the model of the linear motor, and represents the control amount gain.

The invention also provides a linear motor motion control device, which includes:

A memory used to store instructions; wherein the instructions are used to implement the linear motor motion control method described in any of the above embodiments;

A processor is used for executing instructions in the memory.

The proposed invention also provides a computer-readable storage medium. A computer program is stored on the computer-readable storage medium. When the computer program is executed by a processor, the linear motor motion control method as described in any of the above embodiments is implemented.

The above-mentioned embodiments of the proposed invention have at least the following advantages:

1) In the above embodiments of the proposed invention, the composite control of the linear motor is carried out through the extended state observer, the phase advance controller and the model prediction controller, and the characteristics of each control module are coordinated and complementary settings are made to give full play to their respective advantages. Accurate observation and compensation of interference are achieved, which significantly and specifically solves the problem of rapid and precise suppression of motion system interference;

2) The extended state observer designed based on model parameters achieves accurate response and differentiation to various types of interference in the system during the feedback session;

3) The phase advance controller can ensure the rapidity of the system's processing of interference, improve the estimation speed of disturbances and states by the model extended state observer, and jointly ensure the rapid and accurate suppression of interference;

4) A model prediction controller is designed, which is used to dynamically compensate for interference that cannot be observed by the extended state observer. And the optimal control rate is designed, which can dynamically adjust the control parameters to ensure a further suppression for the interference;

5) The proposed method makes full use of the known model of the controlled object and considers the phase lag problem of the observer. This can achieve fast and accurate suppression of disturbances and thereby improve the anti-interference performance of the linear motor.

Those skilled in the art can clearly understand that for the convenience and simplicity of description, for the specific working processes of the above-described systems, devices and modules, reference can be made to the corresponding processes in the foregoing method embodiments. For specific beneficial effects of the systems, devices and modules described above, please refer to the corresponding beneficial effects in the foregoing method embodiments, and will not be described again here.

In the several embodiments provided in this application, it should be understood that the disclosed systems, devices and methods can be implemented in other ways. For example, the system embodiments described above are only illustrative. For example, the division of modules is only a logical function division. In actual implementation, there may be other division methods. For example, multiple modules or components may be combined or can be integrated into another system, or some features can be ignored, or not implemented. On the other hand, the coupling or direct coupling or communication connection between each other shown or discussed may be through some interfaces, indirect coupling or communication connection of devices or modules, which may be in electrical, mechanical or other forms.

The modules described as separate components may or may not be physically separated, and the components shown as modules may or may not be physical modules, that is, they may be located in one place, or they may be distributed to multiple network modules. Some or all of the modules can be selected according to actual needs to achieve the purpose of the solution of this embodiment.

In addition, each functional module in various embodiments of the proposed invention can be integrated into one processing module, or each module can exist physically alone, or two or more modules can be integrated into one module. The above integrated modules can be implemented in the form of hardware or software function modules.

If the integrated module is implemented in the form of a software function module and sold or used as an independent product, it can be stored in a computer-readable storage medium. Based on this understanding, the technical solution of the proposed invention is essentially or contributes to the existing technology or all or part of the technical solution can be embodied in the form of a software product. And the computer software product is stored in a storage medium, which includes several instructions to cause the computer device (which may be a personal computer, a server, or a network device, etc.) to execute all or part of the steps of the methods described in various embodiments of the proposed invention. The aforementioned storage media includes U disk, mobile hard disk, read-only memory (ROM), random access memory (RAM), magnetic disk or optical disk and other media that can store program code.

As mentioned above, the above embodiments are only used to illustrate the technical solution of the proposed invention, but not to limit it. Although the proposed invention has been described in detail with reference to the foregoing embodiments, those of ordinary skill in the art should understand that they can still modify the foregoing. The technical solutions described in each embodiment may be modified, or some of the technical features may be equivalently replaced; however, these modifications or substitutions do not cause the essence of the corresponding technical solutions to deviate from the spirit and scope of the technical solutions of each embodiment of the proposed invention.

We claim:

1. A linear motor motion control method, wherein, it comprises:
   a displacement planning signal and an actual displacement signal of a linear motor are obtained;
   an extended state observer constructed in advance based on model parameters of the linear motor is used to perform state estimation based on a total control amount of the linear motor and the actual displacement signal; and a corresponding displacement observation signal, a speed observation signal and a disturbance observation signal are obtained;
   a pre-constructed phase advance controller is used to improve an estimated lag of the disturbance observation signal and obtain an improved disturbance observation signal;
   a model prediction controller constructed in advance based on a mathematical model of the linear motor is used to perform rolling optimization based on the displacement planning signal, the displacement observation signal and the speed observation signal to obtain an optimal control amount increment;
   the total control amount is updated based on the improved disturbance observation signal and the optimal control amount increment, and a corresponding drive signal is output to a drive end of the linear motor based on an updated total control amount; this achieves a motion control of the linear motor;
   a prediction model used by the model prediction controller is:

$$Y_p(k)=P_x\Delta X(k)+Iy(k)+P_u\Delta U(k)$$

in the formula, k is a current time value, $Y_p(k)$ is a predicted displacement output value sequence ($Y_p(k)=[y(k+1|k)\ y(k+2|k)\ \ldots\ y(k+p|k)]^T_{p\times 1}$), the superscript T indicates transposition, y(k+i|k) is a displacement output value in a future time k+i predicted at a current time k(i=1, 2, . . . , p), $P_x$ is a system matrix ($P_x=[CA\Sigma_{x=1}^{2}CA^x\ \ldots\ \Sigma_{x=1}^{p}CA^x]^T_{p\times 2}$), I is an unit matrix (I=$[1\ 1\ \ldots\ 1]^T_{p\times 1}$), $P_u$ is a control matrix $$(P_u = \begin{bmatrix} CB & 0 & 0 & \cdots & 0 \\ \sum_{x=1}^{2}CA^{x-1}B & CB & 0 & \cdots & 0 \\ \vdots & \vdots & \vdots & \ddots & \vdots \\ \sum_{x=1}^{m}CA^{x-1}B & \sum_{x=1}^{m-1}CA^{x-1}B & \cdots & \cdots & CB \\ \vdots & \vdots & \vdots & \ddots & \vdots \\ \sum_{x=1}^{p}CA^{x-1}B & \sum_{x=1}^{p-1}CA^{x-1}B & \cdots & \cdots & \sum_{x=1}^{p-m+1}CA^{x-1}B \end{bmatrix}_{p\times m},$$

$$A = \begin{bmatrix} 1 & t \\ -a_0t & 1-a_1t \end{bmatrix}, B = \begin{bmatrix} 0 \\ b_0t \end{bmatrix}, C = [1\ 0]),$$

t is a signal sampling interval time, $a_1$ represents a speed gain, $b_0$ represents a control amount gain, $\Delta X(k)$ is an observation signal difference sequence ($\Delta X(k)=[z_1(k)-z_1(k-1)\ z_2(k)-z_2(k-1)]^T$), $z_1(k)$ represents the displacement observation signal at the current time k, $z_1(k-1)$ represents the displacement observation signal at a time k-1, $z_2(k)$ is the speed observation signal at the current time k, $z_2(k-1)$ represents the speed observation signal at the time k-1, y(k) is the actual displacement signal at the current time k, $\Delta U(k)$ is a control increment sequence ($\Delta U(k)=[\Delta u_0(k)\ \Delta u_0(k+1)\ \ldots\ \Delta u_0(k+m-1)]^T_{m\times 1}$), $\Delta u_0(j)$ represents the optimal control amount increment, m is a control time domain, and p is a prediction time domain.

2. The linear motor motion control method according to claim 1, wherein the state estimation based on the total control amount of the linear motor and the actual displacement signal comprises:
   according to the total control amount of the linear motor and the actual displacement signal, the corresponding displacement observation signal, the speed observation signal and the disturbance observation signal are calculated according to the following observation expressions:

$$\begin{cases} \dot{z}_1 = z_2 - l_1(z_1 - y) \\ \dot{z}_2 = z_3 - a_1z_2 - a_0z_1 + b_0u - l_2(z_1 - y) \\ \dot{z}_3 = -l_3(z_1 - y) \end{cases}$$

in the formula, $\dot{z}_1$ is a first-order derivative of the displacement observation signal, $\dot{z}_2$ is a first-order derivative of the speed observation signal, $\dot{z}_3$ is a first-order derivative of the disturbance observation signal, u is the total control amount of the linear motor, y is the actual displacement signal, $z_1$ is the displacement observation signal, $z_2$, is the speed observation signal, $z_3$ is the disturbance observation signal, $l_1$, $l_2$, and $l_3$ are the observation-parameters of the extended state observer, $a_0$, $a_1$ and $b_0$ are the model parameters of the linear motor; among them, $a_0$ represents the displacement gain, $a_1$ represents the speed gain, and $b_0$ represents the control amount gain.

3. The linear motor motion control method according to claim 2, wherein the model of the linear motor is:

$$\dot{v}=-a_0y-a_1v+w(t)+b_0u$$

in the formula, $\dot{v}$ is the first-order derivative of the actual speed signal of the linear motor, v is the actual speed signal of the linear motor, and w(t) is the external disturbance signal;
the observation parameters of the extended state observer satisfy:

$$\begin{cases} l_1 = 3w_o - a_1 \\ l_2 = 3w_o^2 - 3w_oa_1 - a_0 + (a_1)^2 \\ l_3 = w_o^3 \end{cases}$$

in the formula, $w_o$ is an observation bandwidth parameter.

4. The linear motor motion control method according to claim 1, wherein an expression of the phase advance controller is:

$$\frac{z_d}{z_3} = \frac{T_e s + 1}{rT_e s + 1}$$

in the formula, $z_d$ is the improved disturbance observation signal, $z_3$ is the disturbance observation signal, r is an adjustment factor (r=0.5), and $T_e$ is a time constant $$\left(T_e = \frac{1}{rw_o}\right).$$

and s is a Laplace transform factor.

5. The linear motor motion control method according to claim 1, wherein the rolling optimization is performed according to the displacement planning signal, the displacement observation signal and the speed observation signal to obtain the optimal control amount increment, which comprises:

the displacement output value sequence is obtained through the prediction model, and the displacement output value sequence is substituted into the following optimization objective function:

$$J(m,p)=(Y_p(k)-R(k))^T Q(Y_p(k)-R(k))+\Delta U(k)^T W \Delta U(k)$$

in the formula, R(k) is the displacement planning signal sequence $(R(k)=[r(k+1)\ r(k+2)\ \ldots\ r(k+p)]^T_{p \times 1})$, r(k+i) is the displacement planning signal, Q and W are the weight matrix that needs to be designed $(Q=\text{diag}[q_1\ q_2\ \ldots\ q_i]_{p \times p}$, $q_1, q_2, q_i$ respectively correspond to the weight of the first, second, and ith signals in the obtained sequence $Y_p(k)-R(k)$, $W=\text{diag}[w_1\ w_2\ \ldots\ w_i]_{m \times m}$, $w_1, w_2, w_i$ respectively correspond to the weights of the first, second, and ith signals in $\Delta U(k)$); taking $$\frac{dJ}{d\Delta U(k)} = 0$$

as an extreme value condition, the optimization objective function according to the extreme value condition is solved, and the optimal control amount increment is obtained:

$$\Delta u_0(k)=[1\ 0\ \ldots\ 0]_{1 \times m}(P_u^T Q^T Q P_u + W^T W)^{-1} P_u^T Q^T Q (R(k+1)-P_x \Delta X(k)-Iy(k)).$$

6. The linear motor motion control method according to claim 5, wherein the updating of the total control amount according to the improved disturbance observation signal and the optimal control amount increment comprises:

an optimal control amount according to the optimal control amount increment is obtained;

the total control amount is updated according to the following formula:

$$u = u_0 - \frac{z_d}{b_0}$$

in the formula, u represents the total control amount, $u_0$ represents the optimal control amount, $z_d$ is the improved disturbance observation signal, $b_0$ is a parameter in the model of the linear motor and represents the control amount gain.

7. A linear motor motion control device, wherein it comprises:

a memory is used to store instructions; wherein the instructions are used to implement the linear motor motion control method of claim 1;

a processor is used for executing instructions in the memory.

8. A non-transitory computer-readable storage medium, wherein a computer program is stored on the non-transitory computer-readable storage medium, and when the computer program is executed by a processor, the linear motor movement control method is realized.

* * * * *